(12) United States Patent
Kihara et al.

(10) Patent No.: US 6,903,852 B2
(45) Date of Patent: Jun. 7, 2005

(54) IMAGE-REPRODUCING APPARATUS AND IMAGE-REPRODUCING METHOD

(75) Inventors: Nobuhiro Kihara, Kanagawa (JP); Akira Shirakura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/699,701

(22) Filed: Nov. 4, 2003

(65) Prior Publication Data

US 2004/0120021 A1 Jun. 24, 2004

Related U.S. Application Data

(63) Continuation of application No. 09/906,672, filed on Jul. 18, 2001, now Pat. No. 6,738,170.

(30) Foreign Application Priority Data

Jul. 19, 2000 (JP) ..................................... P2000-219504

(51) Int. Cl.[7] .............................. G03H 1/22; G03H 1/26
(52) U.S. Cl. .............................. 359/23; 359/32; 359/34; 359/900
(58) Field of Search ................................ 359/8, 23, 30, 359/32, 33, 34, 900

(56) References Cited

U.S. PATENT DOCUMENTS

| 5,341,230 | A | * | 8/1994 | Smith ......................... 359/13 |
| 5,455,693 | A | | 10/1995 | Wreede et al. |
| 5,504,593 | A | | 4/1996 | Hotta et al. |
| 5,619,586 | A | | 4/1997 | Sibbald |
| 5,698,906 | A | * | 12/1997 | Gardner et al. .............. 307/9.1 |
| 5,742,411 | A | | 4/1998 | Walters |
| 6,018,403 | A | | 1/2000 | Shirakura et al. |
| 6,118,589 | A | | 9/2000 | Angelo et al. |

FOREIGN PATENT DOCUMENTS

| EP | 0 864 947 A2 | 9/1998 |
| JP | 62-250472 A | 10/1987 |
| JP | 2000-162995 A | 6/2000 |
| WO | WO 95 04294 A | 2/1995 |
| WO | WO 01 46722 A1 | 6/2001 |

OTHER PUBLICATIONS

European Search Report of Sep. 5, 2003.

* cited by examiner

Primary Examiner—John Juba, Jr.
(74) Attorney, Agent, or Firm—Rader, Fishman & Grauer, PLLC; Ronald P. Kananen

(57) ABSTRACT

An optical member 7 is bonded, at its rear side 7b, to a holographic stereogram 6. The front side 7a of the optical member 7 consists of parallel triangular prisms. Illumination light 9 is applied to the front surface 7a of the optical member 7 at a predetermined angle of, for example, 60°. The optical member 7 is made of for example, optical glass or transparent plastic. Each triangular prism has an incidence surface 8, to which the illumination light is applied at right angles. The illumination light is applied to the interface 22 between the optical member 7 and the holographic stereogram 6, at an incidence angle θ of, for example, 60°, thereby to suppress surface reflection of the illumination light 9 at the interface 22.

2 Claims, 12 Drawing Sheets

IMAGE-REPRODUCING APPARATUS AND IMAGE-REPRODUCING METHOD

This is a divisional application of Ser. No. 09/906,672, field on Jul. 18, 2001, now U.S. Pat. No. 6,738,170.

BACKGROUND OF THE INVENTION

1. Field of the Invention

The present invention relates to an apparatus and method for reproducing a 2- or 3-dimensional image from a hologram or a holographic stereogram 1 on which two- or three-dimensional image data is recorded.

2. Description of the Related Art

A holographic stereogram is prepared by recording a number of rectangular or dot-shaped element holograms on one hologram-recording medium. The element holograms are original images that have been obtained by photographing an object, sequentially from different points of observation.

A holographic stereogram containing parallax data concerning only the horizontal direction, for example, is prepared as is illustrated in FIG. 1. First, an object 100 is photographed from different observation points that lie in the same horizontal plane. A number of original images 101a–101e of the object 100 are thereby obtained. Then, the original images 101a–101e, which are rectangular element holograms, are sequentially recorded on a hologram-recording medium 102.

The holographic stereogram records image data representing rectangular element holograms that have been obtained by photographing all object, sequentially from different observation points that lie in the same horizontal plane. When an observer looks at the holographic stereogram, the two 2-dimensional images his left eye and right eye receive, respectively, are different a little. The observer therefore perceives parallax and sees a 3-dimensional image.

An ordinary hologram is spaced from an illumination light source for, reproducing a 3-dimensional image. A large space is required to reproduce the 3-dimensional image. To reproduce the 3-dimensional image in optimal conditions, the hologram and the light source need to have a particular positional relationship. This holds true of a holographic stereogram that consists of a plurality of element holograms.

If the hologram and the illumination light source are combined, no space is required for illumination. This helps to reduce the size of the apparatus for reproducing 3-dimensional images. In addition, a 3-dimensional image can always be reproduced in the best possible conditions because the hologram and the illumination light source have a fixed positional relation. A 3-dimensional image may be reproduced in such conditions from a so-called "edge-lit hologram." A recording medium bonded to a transparent light-introducing block is used to reproduce a 3-dimensional image from an edge-lit hologram.

A transmitting hologram of edge-lit type, from which a 3-dimensional image can be reproduced, is prepared as is illustrated in FIG. 2. To be more specific, a hologram-recording medium 111 is bonded to one surface 110a of a transparent light-introducing block 110. The light-introducing block 110 is made of transparent material such as glass or plastic and has an appropriate thickness. In most cases, the medium 111 is bonded with index-matching liquid (not shown) to the light-introducing block 110. This prevents total reflection at the surface 110a of the block 110. Body light 114 from an object 113 is applied from the opposing surface 110b of the light-introducing block 110 to the hologram-recording medium 111. Reference light 115 is simultaneously applied from one end 110c of the block 110 to hologram-recording medium 111. A transmitting hologram of edge-lit type is thereby prepared.

To reproduce an image from the transmitting hologram of edge-lit type, thus prepared, the hologram-recording medium is bonded to a light-introducing block made of, for example, glass. More precisely, as shown in FIG. 3, a hologram 121 is bonded with index-matching liquid (not shown) to one surface 120a of a light-introducing block 120. Image-reproducing light 123 is applied from one end 120b of the block 120 to the hologram 121. The hologram 121 diffracts the light passing through it. The light 124 diffracted forms a reproduced image 125, which is observed by an observer 126.

As shown in FIG. 3, the image-reproducing light 123 is incident on the one end 120b of the block 120 at angle of 60°. Since the light 123 is thus applied to the hologram 121 though the light-introducing block 120, it is possible to prevent surface reflection at the interface between the hologram 121 and air. The larger the angle of incidence, the more readily the surface reflection can be prevented. In view of this it is considered that a compact apparatus can reproduce an image from the edge-lit hologram.

The hologram 121 and the light-introducing block 120 are bonded as shown in FIG. 3. The resultant unit is inevitably large, which is inconvenient in view of transportation and storage.

As pointed out above, the image-reproducing light 123 is incident on the one end 120b of the block 120 at angle of 60°. The hologram 121 may have a length L of 30 mm and the one surface 120a of the block 120 may have a length that is at least nearly equal to the length L. In this case, the light-introducing block 120 needs to be at least 17.3 mm thick.

A number of edge-lit holograms are therefore inconvenient in view of transportation and storage. This is because, each edge-lit hologram is bonded to a light-introducing block that is 17.3 mm thick. That is, each edge-lit hologram must be transported and stored, together with such a long block.

BRIEF SUMMARY OF THE INVENTION

The present invention has been made in view of the foregoing. An object of the invention is to provide an image-reproducing apparatus that is smaller and lighter than the conventional apparatus that uses a light-introducing block to reproduce an image from an edge-lit hologram. The apparatus can therefore be easy to transport and store. The invention can provide an image-reproducing method, too, which uses no light-introducing blocks to reproduce images.

To achieve the object, an image-reproducing apparatus according to the invention comprises a hologram or a holographic stereogram and an optical member bonded, at its rear surface, to the hologram or holographic stereogram. The optical member has parallel prisms on the front surface. Illumination light is applied to the front surface of the optical member. The illumination light interferes with light diffracted while travelling through the hologram or holographic stereogram. An image is thereby reproduced from the hologram or holographic stereogram that records a 2- or 3-dimensional image. Each prism has an incidence surface, to which the illumination light is applied at right angles.

In the image-reproducing apparatus, the illumination light is applied to an interface between the optical member and the hologram or holographic stereogram at a fixed incidence angle falling within a specific range, thereby to suppress surface reflection of the illumination light at the interface. More precisely, the fixed incidence angle ranges from 60° to 85°, with respect to a normal to the interface.

In the image-reproducing apparatus, the hologram or holographic stereogram and the optical member bonded thereto may be bent, forming a hollow cylinder, the inner surface of which is defined by the front surface of the optical member. In this case, the illumination light is applied to an inner surface of the hollow cylinder, thereby reproducing a 2- or 3-dimensional image from the hologram or holographic stereogram. Thus, the apparatus can reproduce an image from a hollow cylindrical hologram of edge-lit type.

In the image-reproducing apparatus, the illumination light may be applied to an interface between the optical member and the hologram or holographic stereogram, at a fixed incidence angle falling within a specific range, thereby to suppress surface reflection of the illumination light at the interface. More precisely, the fixed incidence angle ranges from 60° to 85°, with respect to a normal to the interface.

In the image-reproducing apparatus, the hologram or holographic stereogram and the optical member bonded thereto may be bent, forming a hollow cylinder, the inner surface of which is defined by the front surface of the optical member. In this case, the illumination light is applied to an inner surface of the hollow cylinder, thereby reproducing a 2- or 3-dimensional image from the hologram or holographic stereogram. Thus, the apparatus can reproduce an image from a hollow cylindrical hologram of an edge-lit type.

An image-reproducing apparatus according to the invention comprises a hologram or a holographic stereogram and an optical member. The optical member has parallel prisms on a part of a front surface and is bonded at the rear surface to the hologram or holographic stereogram. Illumination light is applied to the parallel prisms. After passing through the optical member, the illumination light interferes with light diffracted while travelling through the hologram or holographic stereogram. An image is thereby reproduced from the hologram or holographic stereogram that records a 2- or 3-dimensional image.

The optical member may have a wave-guiding section for guiding the illumination light from the parallel prisms, while reflecting the illumination light. To increase the contrast of the image, the light-guiding section may be tinted black at an outer surface.

In this image-reproducing apparatus, too, the hologram or holographic stereogram and the optical member bonded thereto may be bent, forming a hollow cylinder, the inner surface of which is defined by the front surface of the optical member. The illumination light is applied to an inner surface of the hollow cylinder, thereby reproducing a 2- or 3-dimensional image from the hologram or holographic stereogram.

In the image-reproducing apparatus, the angle at which the illumination light is applied to the prisms may be fixed or changed.

To attain the object described above, an image-reproducing method of this invention is designed to reproduce an image from a hologram or a holographic stereogram, which records either 2-dimensional image data or 3-dimensional image data. In the method, an optical member having parallel prisms on a front surface is bonded at the rear surface to the hologram or holographic stereogram. Illumination light is applied to the front surface of the optical member. An image is thereby reproduced from the hologram or holographic stereogram that records a 2- or 3-dimensional image. The optical member has a plurality of incidence surfaces on the front surface, and the illumination light is applied at right angles to the incidence surfaces of the optical member.

In the image-reproducing method, the illumination light may be applied to an interface between the optical member and the hologram or holographic stereogram, at a fixed incidence angle falling within a specific range, thereby to suppress surface reflection of the illumination light at the interface. The hologram or holographic stereogram and the optical member bonded thereto may be bent, forming a hollow cylinder, the inner surface of which is defined by the front surface of the optical member. In this case, the illumination light is applied to an inner surface of the hollow cylinder, thereby reproducing a 2- or 3-dimensional image from the hologram or holographic stereogram.

In the image-reproducing method, the illumination light may be applied to an interface between the optical member and the hologram or holographic stereogram, at different incidence angles falling within a specific range, thereby to suppress surface reflection of the illumination light at the interface. In this case, too, the hologram or holographic stereogram and the optical member bonded thereto may be bent, forming a hollow cylinder, the inner surface of which is defined by the front surface of the optical member. The illumination light is applied to an inner surface of the hollow cylinder, thereby reproducing a 2- or 3-dimensional image from the hologram or holographic stereogram.

In an image-reproducing method according to the invention, an optical member having parallel prisms on a part of a front surface is bonded at the rear surface to the hologram or holographic stereogram. Illumination light is applied to the parallel prisms. After passing through the optical member, the illumination light interferes with light diffracted while travelling through the hologram or holographic stereogram. An image is thereby reproduced from the hologram or holographic stereogram that records a 2- or 3-dimensional image.

The optical member may have a light-guiding section for guiding the illumination light from the parallel prisms, while reflecting the illumination light. To increase the contrast of the image, the light-guiding section may be tinted black at an outer surface.

In this method, too, the hologram or holographic stereogram and the optical member bonded thereto may be bent, forming a hollow cylinder, the inner surface of which is defined by the front surface of the optical member. The illumination light is applied to an inner surface of the hollow cylinder, thereby reproducing a 2- or 3-dimensional image from the hologram or holographic stereogram.

In this image-reproducing apparatus, the angle at which the illumination light is applied to the prisms may be fixed or changed.

The present invention can provide an image-reproducing apparatus that is smaller and lighter than the conventional apparatus that uses a light-introducing block to reproduce an image from an edge-lit hologram. The apparatus can therefore be easy to transport and store. The invention can provide an image-reproducing method, too, which uses no light-introducing blocks to reproduce images. The apparatus and method of the invention can not only utilize the illumination light emitted from a light source, in the best possible manner, but also reproduce an image even if illumination light beams are applied at different angles to the different parts of the hologram. Moreover, the present invention can provide a hollow cylindrical hologram of edge-lit type.

DETAILED DESCRIPTION OF THE INVENTION

Several embodiments of the present invention will be described, with reference to the accompanying drawings. The invention is not limited to the embodiments described below, nonetheless. Various changes and modifications can be made within the scope and spirit of the present invention.

Figure 1:
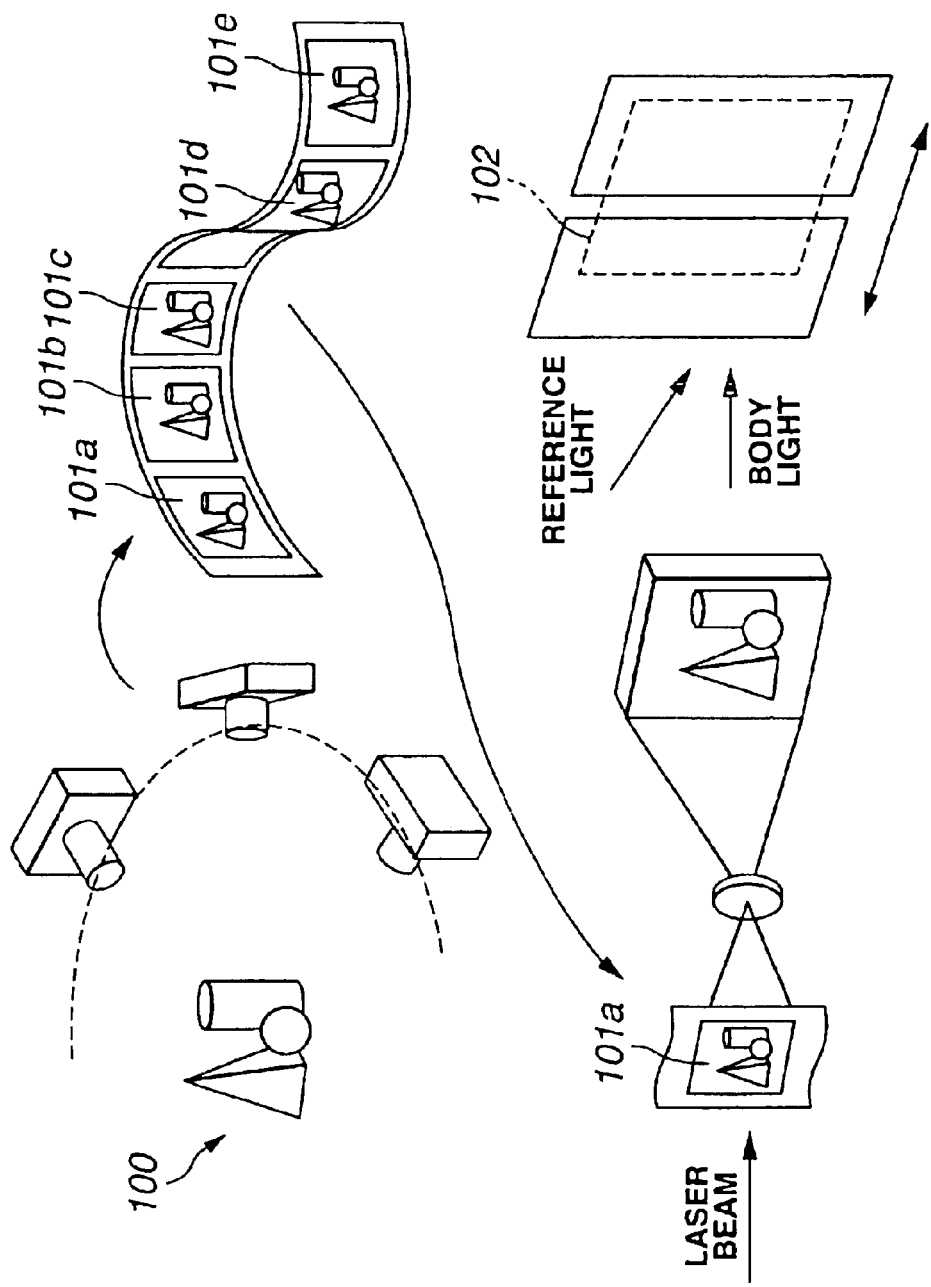
FIG. 1 is a diagram explaining a method of preparing a holographic stereogram, which is the first embodiment of the invention.
Figure 2:
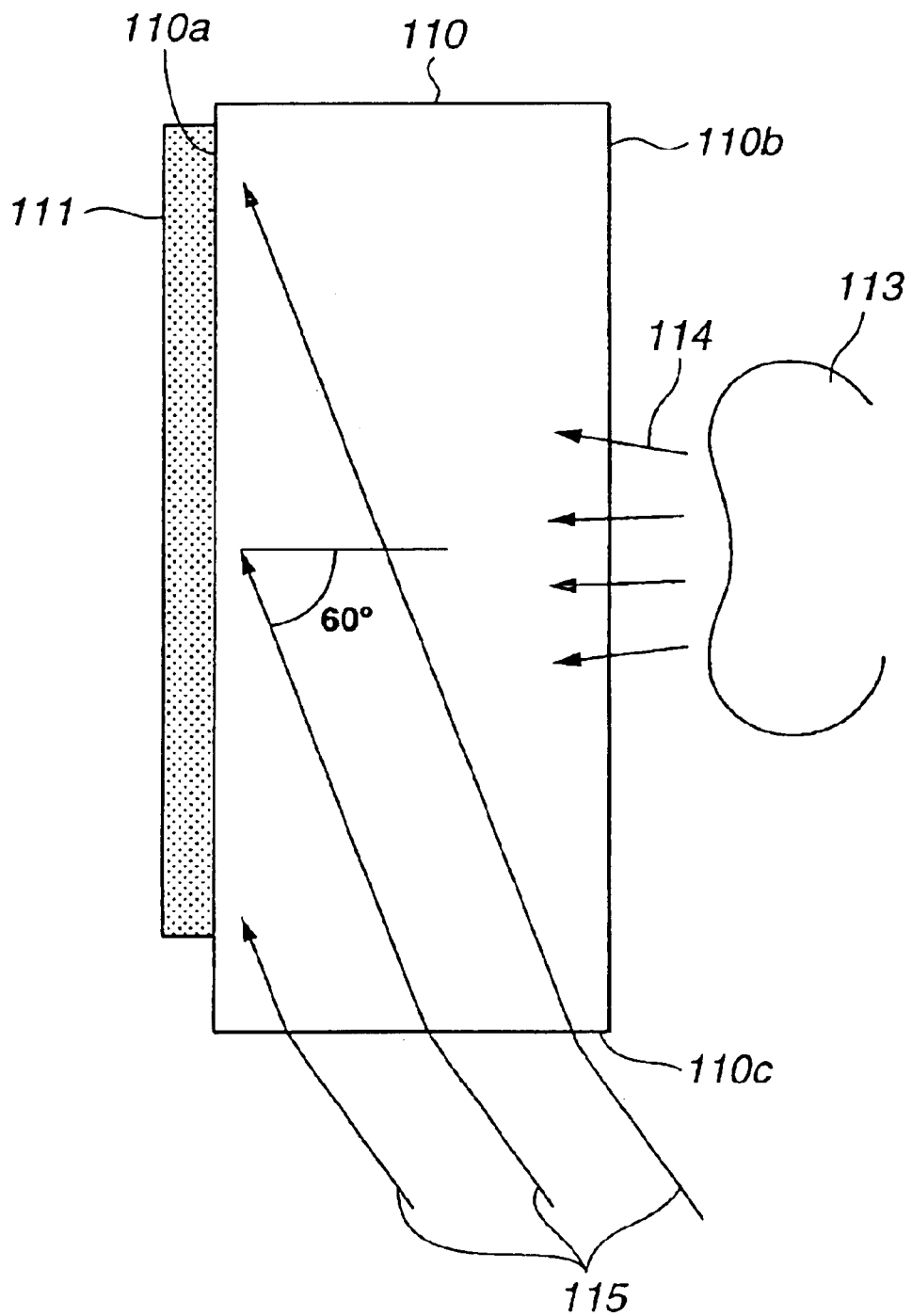
FIG. 2 is a diagram explaining the method of preparing a transmitting hologram of edge-lit type.
Figure 3:
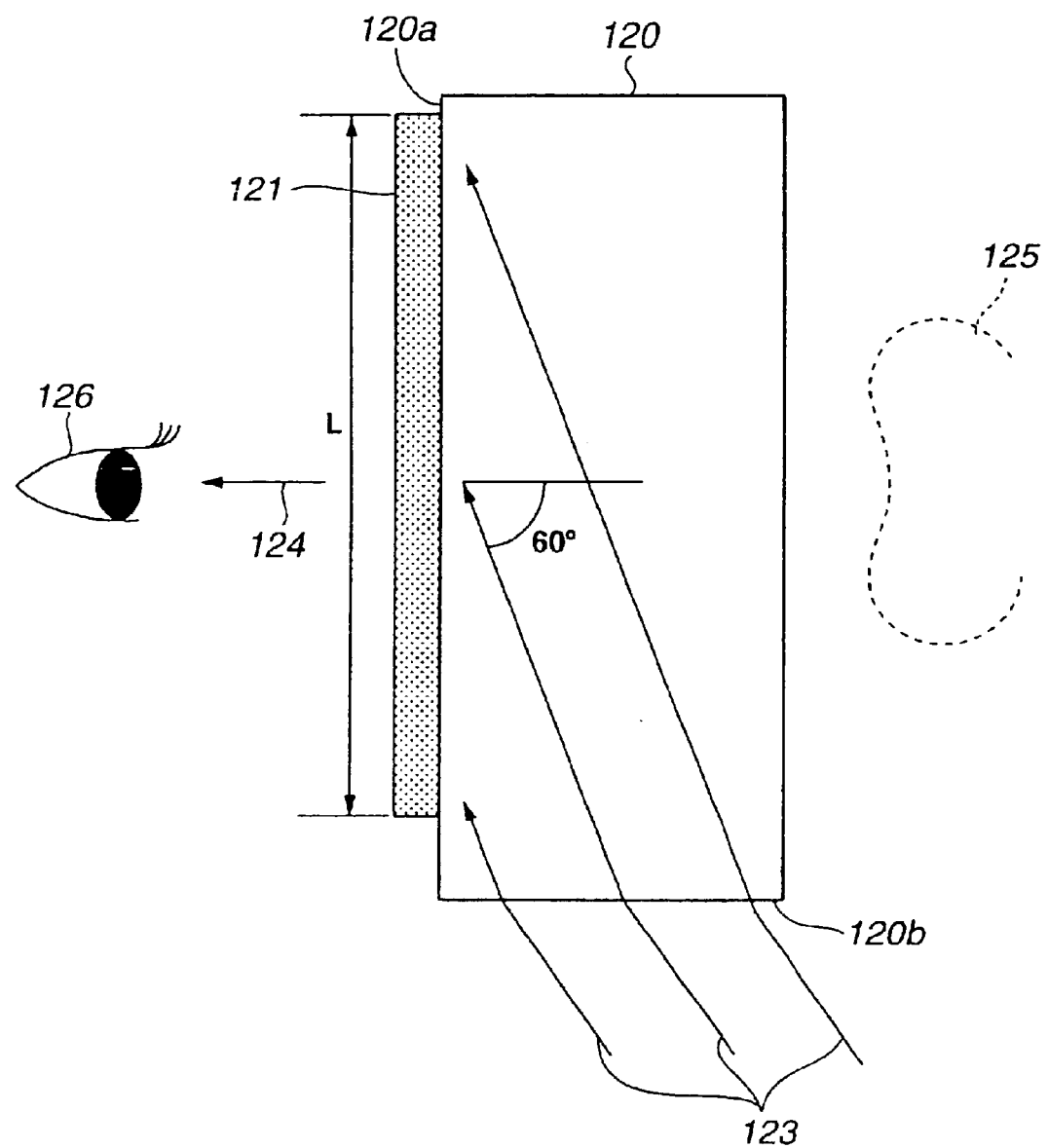
FIG. 3 is a diagram explaining a method of reproducing an image from the edge-lit hologram.
Figure 4:
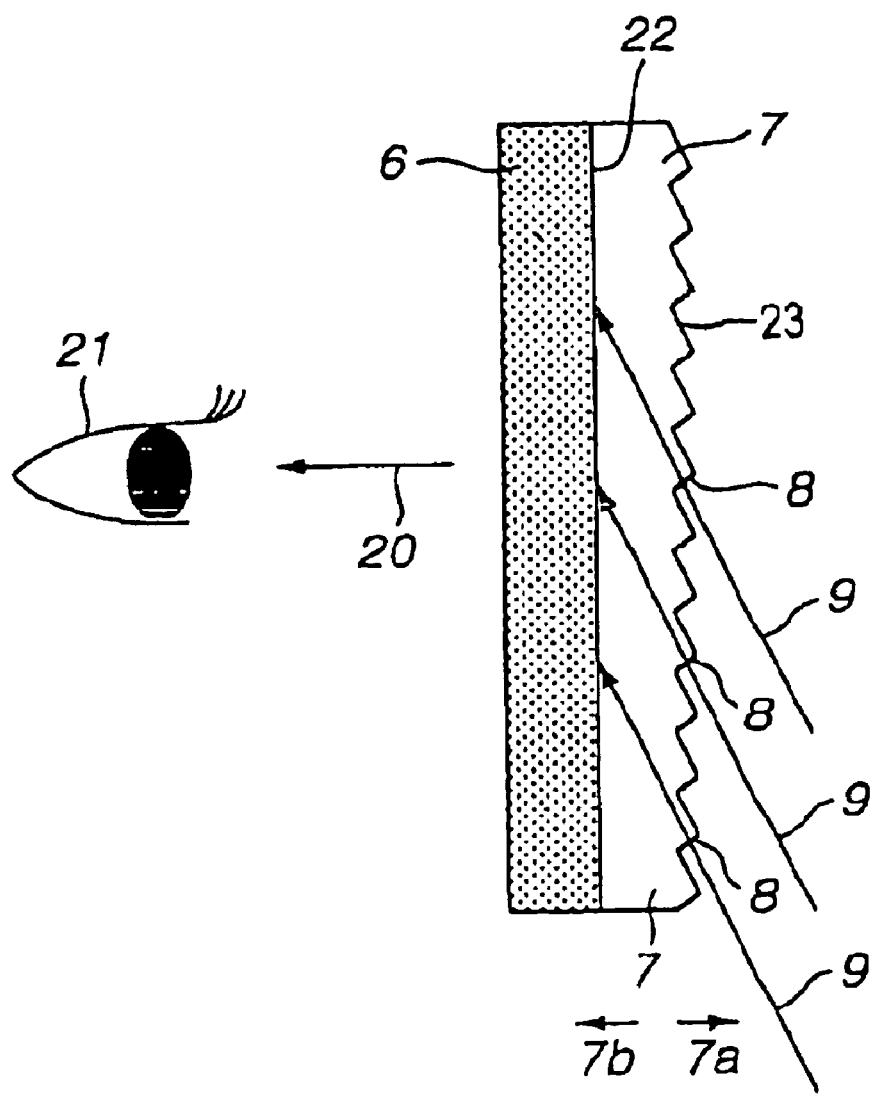
FIG. 4 illustrates an image-reproducing apparatus that is the first embodiment of the present invention.

The first embodiment is an image-reproducing apparatus 5 shown in FIG. 4. The apparatus 5 is designed to reproduce a holographic stereogram recording 3-dimensional imaged data. As FIG. 4 shows, the apparatus comprises the holographic stereogram 6 and an optical member 7. The optical member 7 has a front side 7a and a rear side 7b opposing the front side 7a. The front side 7a consists of parallel triangular prisms, each having an incidence surface 8 and an inclined surface 23. The optical member 7 is bonded at its rear surface 7b to the holographic stereogram 6. Illumination light 9 is applied to the front surface 7a of the optical member 7 at a predetermined angle of, for example, 60°.

Figure 5:
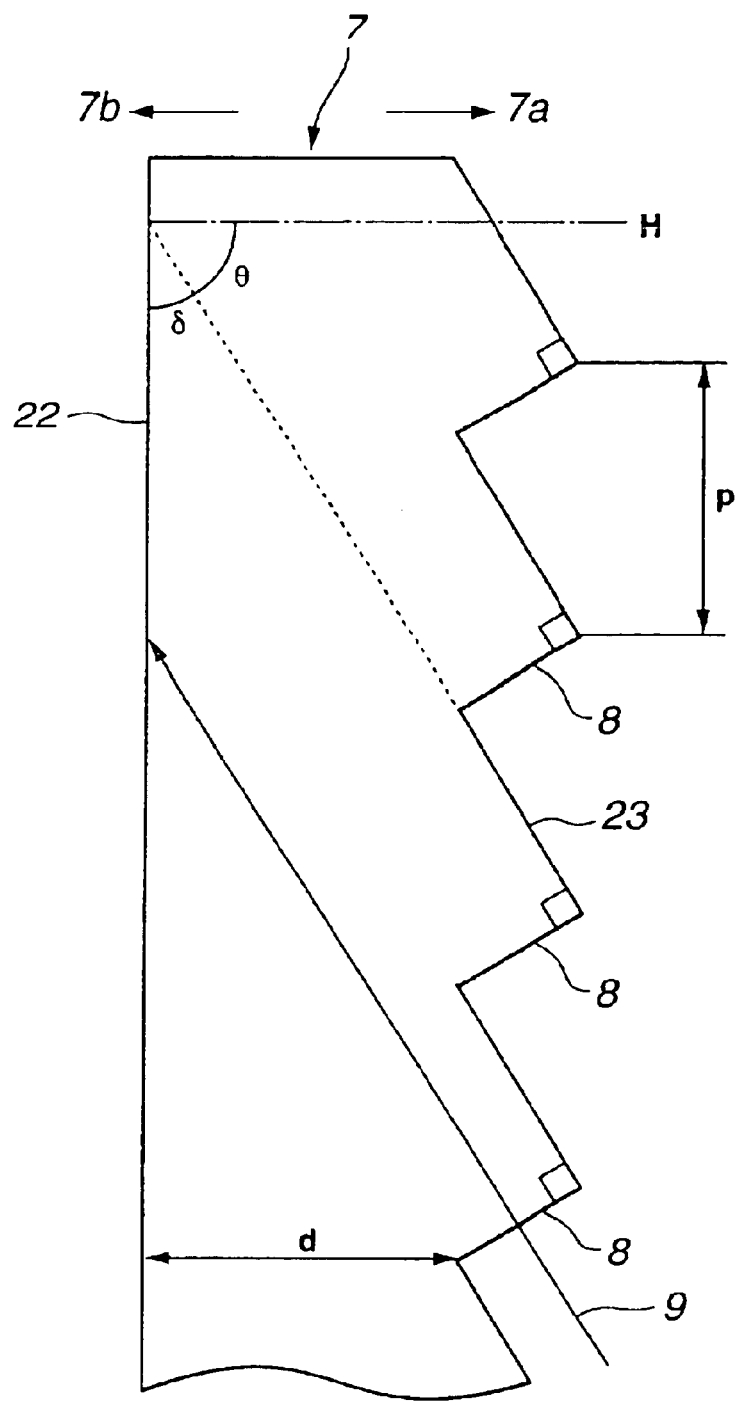
FIG. 5 is a magnified view of the optical member that is a component of the image-reproducing apparatus shown in FIG. 4.

The optical member 7 is made of, for example, optical glass, plastic or the like. The optical member 7 has a plurality of incidence surfaces 8 on the front side 7a. Each incidence surface 8 receives the illumination light 9 applied to it in the direction perpendicular to it. As FIG. 5 shows, the illumination light 9 is applied to the interface 22 between the holographic stereogram 6 and the optical member 7 at a predetermined incidence angle θ. The incidence angle θ is, for example, 60°, so that surface reflection can be prevented at the interface 22.

The incidence angle θ is one defined between the interface 22 and the normal H thereto. The angle between the surface 23 that each parallel triangular prism on the front side 7a of the optical member 7 defines with respect to the interface 22 is 60°, like the above-mentioned incidence angle. If the illumination light 9 applied from the light source (not shown) consists of parallel beams, it is applied to the incidence surfaces 8 at 90°. This effectively suppresses surface reflection at the incidence surfaces 8. From the angle at which the illumination light is applied to the optical member 7 it is known that the incidence angle e should fall within the range of 60° to 85°.

The shorter the pitch p of the triangular prism of the optical in member 7, the better. Generally, it is sufficient to set the pitch p at 0.5 mm or less. In the present embodiment, the pitch p is 100 μm. Thus, the incidence surfaces 8 are arranged on the front side 7a of the optical member 7, at intervals of 100 μm. The optical member 7 has a thickness d of 100 μm. It is thick enough to impart an adequate stiffness to the holographic stereogram 6. If supported firmly by the optical member, the holographic stereogram 6 can have desired optical properties.

In the image-reproducing apparatus 5 thus constructed, the illumination light 9 applied to the interface 22 at the angle θ, through the incidence surfaces 8, is diffracted as it passes through the holographic stereogram 6. The light 20 thus diffracted forms a reproduced image, which an observer 21 may see.

The image-reproducing apparatus 5 is smaller and lighter than the conventional apparatus having a light-introducing block and designed to reproduce a holographic stereogram of edge-lit type. It can therefore be more easily transported and stored.

A system for preparing a holographic stereogram to be reproduced by the image-reproducing apparatus 5 that is the first embodiment of the invention will be described. The system records a plurality of rectangular element holograms on one recording medium, thereby to prepare a holographic stereogram that contains horizontal parallax data. Needless to say, the present invention can be applied to a system that records dot-shaped element holograms on a recording medium, thereby to prepare a holographic stereogram that contains both horizontal parallax data and vertical parallax data.

Figure 6:
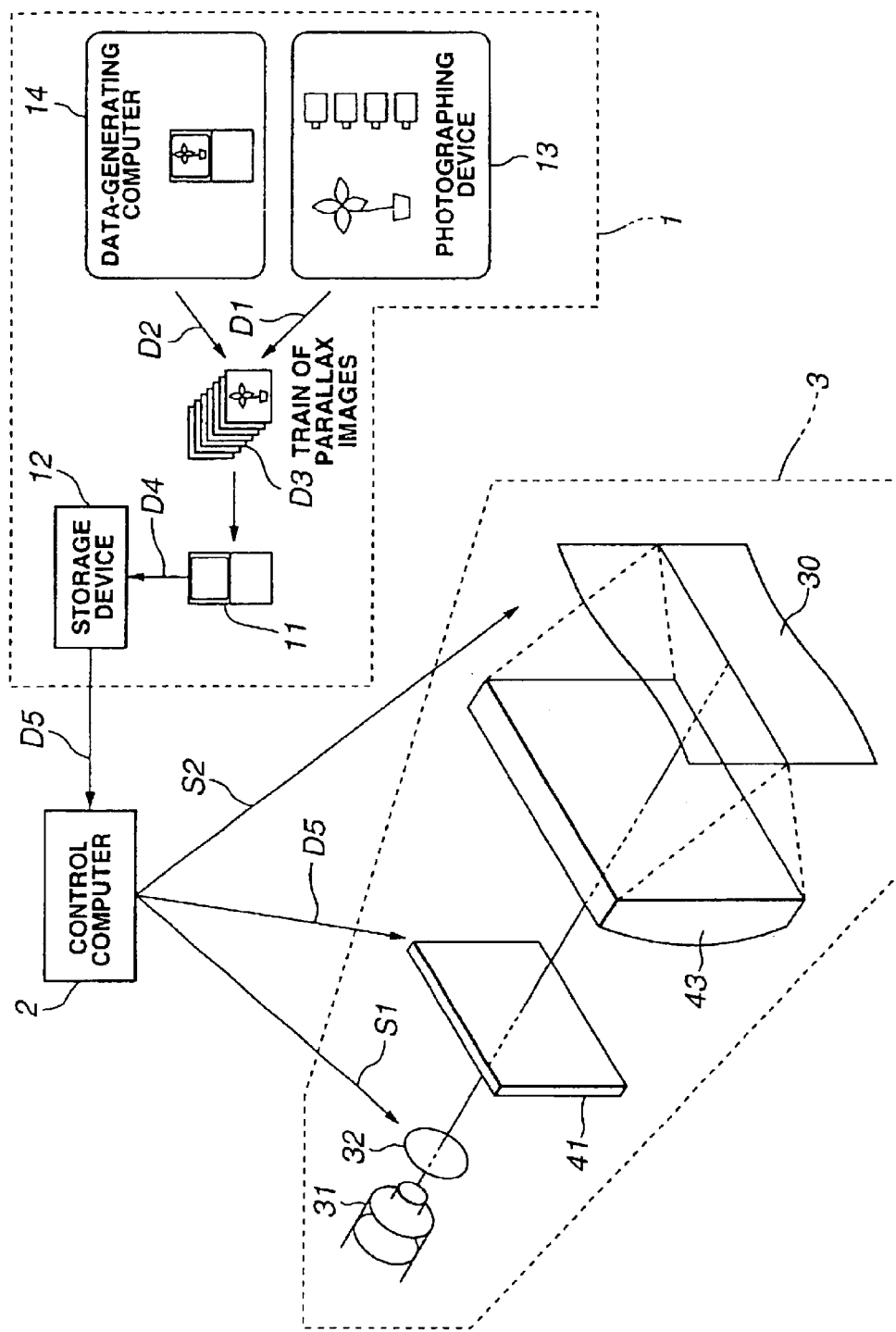
FIG. 6 is a system for preparing a holographic stereogram.

The system is designed to prepare so-called "one-step holographic stereograms," each being a hologram-recording medium on which the pattern formed by interference between the body light and the reference light is recorded. As shown in FIG. 6, the system comprises a data-processing section 1, a control computer 2 and a holographic stereogram printer 3. The section 1 processes the data to be recorded on the hologram-recording medium. The control computer 2 controls the other components of the system. The printer 3 has an optical system for preparing holographic stereograms.

The data-processing section 1 has an image-processing computer 11, a storage device 12, a photographing device 13, and a data-generating computer 14. The photographing device 13 incorporates a multi-lens camera or a mobile camera. It provides image data items D1, each containing parallax data. The data-generating computer 14 generates image data items D2, each containing the parallax data. A train of parallax images D3 is generated from the image data items D1 and the image data items D2.

The image data items D1 supplied from the photographing device 13, each containing parallax data, represent the images of an object that the multi-lens camera has photographed at the same time, or the images of the object that the mobile camera has photographed at different times from different observation points.

The image data items D2 generated by the computer 14, each containing parallax data, represent the CAD (Computer Aided Design) images, CG (Computer Graphics) images or the like, which have horizontal parallax with respect to each other.

In the data-processing section 1, the image-processing computer 11 processes the parallax images D3, generating image data D4. The image data D4 is recorded in the storage device 12. The storage device 12 is a memory, a hard disc drive, or the like.

The image data D4 is read from the storage device 12, image by image. The data D4 thus read is supplied, as image data D5, from the data-processing section 1 to the control computer 2. The image data D5 will be recorded on a hologram-recording medium.

The control computer 2 drives the holographic stereogram printer 3. The printer 3 records the images represented by the data D5 supplied from the data-processing section 1. More precisely, the printer 3 records the data D5 on a hologram-recording medium 30, in the form of rectangular element holograms.

The control computer 2 controls the shutter 32, display 41 and medium-feeding mechanism 50, all incorporated in the holographic stereogram printer 3. More specifically, the computer 2 supplies a control signal S1 to the shutter 32, thus opening or closing the shutter 32. It supplies the image data D5 to the display 41, which displays the image represented by the data D5. It supplies a control signal S2 to the medium-feeding mechanism 50, which feeds the hologram-recording medium 30 to a specific position. At this position, the data D5 is recorded on the hologram-recording medium 30.

Figure 7:
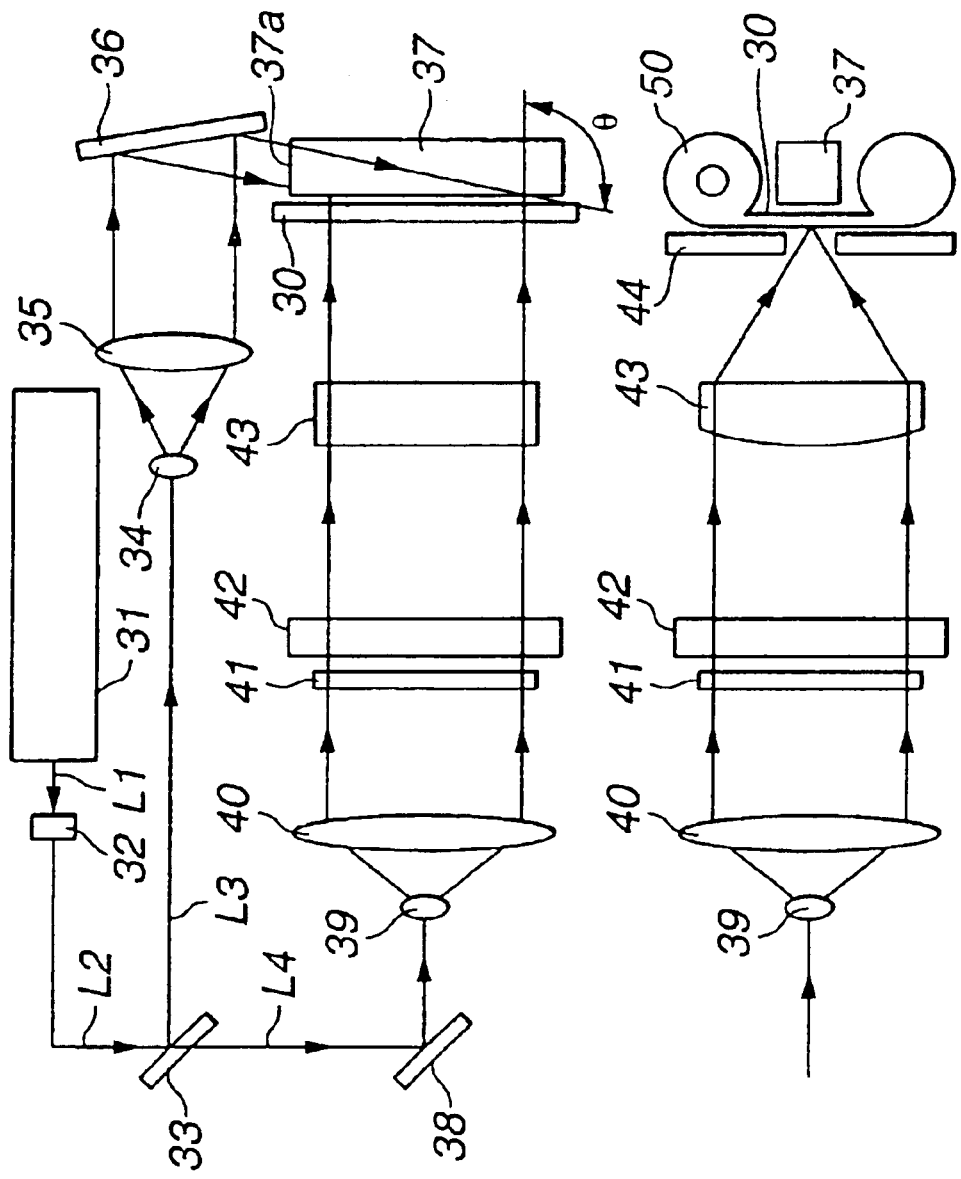
FIGS. 7A and 7B are diagrams illustrating the optical system incorporated in a holographic stereogram printer.

The holographic stereogram printer 3 will be described ill detail, with reference to FIGS. 7A and 7B. FIG. 7A is a plan view of the optical system incorporated in the holographic stereogram printer 3. FIG. 7B is a side view of the section of the optical system, which processes the body light.

As FIG. 7A shows, the holographic stereogram printer 3 comprises a laser 31, a shutter 32, and a half mirror 33. The laser 31 emits a laser beam L1. The shutter 32 and the half mirror 33 are arranged on the optical axis of the laser beam L1. The laser beam L1 has wavelength of about 532 nm.

The shutter 32 is controlled by the control computer 2. It remains closed when the hologram-recording medium 30 need not be exposed to light at all. It is opened to apply light to the medium 30. The half mirror 33 receives the laser beam L2 that has passed through the shutter 32. The half mirror 33 splits the laser beam 2 into reference light L3 and body light L4. The reference light L3 is a part of the beam L2, which the half mirror 33 reflects. The body light L4 is the remaining part of the beam L2, which passes through the half mirror 33.

The holographic stereogram printer 3 further comprises a cylindrical lens 34, a collimator lens 35, and a total reflection minor 36. The lenses 34 and 35 and the mirror 36 are arranged on the optical axis of the reference light L3, in the order they are mentioned. They constitute an optical system for processing the reference light L3. The collimator lens 35 converts the reference light L3 to parallel light. The mirror 36 reflects all parallel light applied from the collimator lens 35.

The cylindrical lens 34 causes the reference light L3 reflected by the half mirror 33 to diverge. The collimator lens 35 changes the reference light L3 to parallel light. The total reflection mirror 36 reflects all parallel light, which is applied to the hologram-recording medium 30. The medium 30 is bonded with index-matching liquid (not shown) to a light-introducing block 37 that is made of transparent glass. The reference light L3 is applied to the medium 30 through the light-introducing block 37.

That is, the reference light L3 is applied to one side 37a of the block 37, passes through the block 37 and is applied to the medium 30 at a large incidence angle.

The holographic stereogram printer 3 further comprises a total reflection mirror 38, a spatial filter 39, a collimator lens 40, a display 41, a diffuser panel 42, and a cylindrical lens 43, as is illustrated in FIGS. 7A and 7B. The mirror 38, filter 39, lens 40, display 41, panel 42 and lens 43 are arranged in the order mentioned, on the optical axis of the body light L4 that has passed through the half mirror 33. They constitute an optical system for processing the body light L4. The total reflection mirror 38 totally reflects the body light L4. The spatial filter 39 is composed of a convex lens and a pinhole member. The collimator lens 40 converts the body light L4 to parallel light. The display 41 displays the image to be recorded. The diffuser panel 42 diffuses the light coming through the display 41. The cylindrical lens 43 focuses the body light L4 on the hologram-recording medium 30. Further, a mask 44 having a rectangular opening is provided in front of the medium 30.

First, the total reflection mirror 38 reflects the body light L4 that has passed through the half mirror 33. The spatial filter 39 changes the body light L4 to diverging light. The collimator lens 40 converts the diverging light to parallel light, which is applied to the display 41. The display 41 is a transmission display such as a liquid crystal display. When controlled by the control computer 2, the display 41 displays the image represented by the image data D5. The image modulates the light passing through the display 41. The diffuser panel 42 diffuses the light, which is applied to the cylindrical lens 43. The panel 42, which slightly diffuses the light from the display 41, serves to improve the quality of the holographic stereogram.

The light emerging from the display 41 is applied to the cylindrical lens 43. The lens 43 makes the light converge in a horizontal plane. A part of the light thus processed passes through the rectangular opening of the mask 42 and is applied, as body light, to the hologram-recording medium 30. Thus, the light projected from the display 41 is applied to the medium 30, in the form of a light beam that has a rectangular cross section. More correctly, the body light is incident at almost night angle to that surface of the medium 30, which faces away from the light-introducing block 37.

In the optical system described above, the optical path of the reference light been reflected by the half mirror 33 and applied to the medium 30 through the light-introducing block 37 has almost the same length as the optical path of the body light applied to the medium 30 through the display 41 after passing through the half minor 33. The reference light can interfere with the body light more than otherwise. This makes it possible to prepare a holographic stereogram from which a clear image may be reproduced.

In the holographic stereogram printer 3, it is desired that a mechanism for dripping index-matching liquid be provided between the light-introducing block 37 and the hologram-recording medium 30, to achieve index matching for the block 37 and medium 30. For example, a foam-rubber block impregnated with index-matching liquid is arranged near the position where the block 37 contacts the medium 30. Thus, every time a hologram-recording medium 30 is set in place, the index-matching liquid is applied from the foam-rubber block into the interface between the medium 30 and the light-introducing block 37. Index matching is thereby accomplished between the light-introducing block 37 and the hologram-recording medium 30.

Generally, reference light and body light are applied to one surface of a hologram-recording medium to prepare a transmitting holographic stereogram. To prepare a transmitting holographic stereogram of an edge-lit type, reference light must be applied through a light-introducing block to the same surface of the medium as body light is applied. It is therefore necessary to arrange the light-introducing block between the medium and the cylindrical lens that is provided to focus the body light. However, the light-introducing block can hardly be arranged so, due to the limited space available.

In the holographic stereogram printer 3 described above, it suffices to apply the body light and the reference light to the opposing surfaces of the medium 30, respectively, in order to prepare a transmitting holographic stereogram of an edge-lit type. Thus, the cylindrical lens 43 is located on one side of the medium 30, whereas the light-introducing block 37 is arranged on the other side of the medium 30, in spite of the limited space available in the holographic stereogram printer 3.

Figure 8:
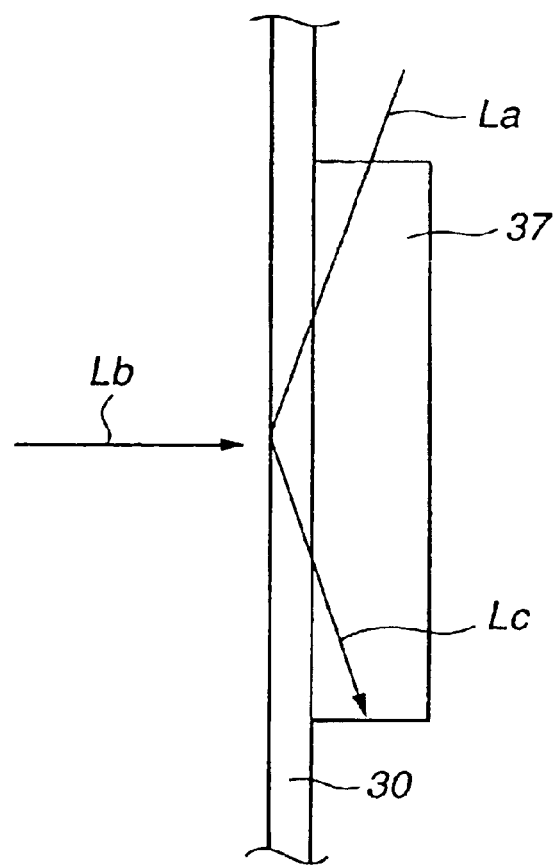
FIG. 8 is a diagram illustrates how to prepare a transmitting holographic stereogram of edge-lit type.

The hologram-recording medium 30 records a holographic stereogram from which an image is reproduced not only by applying the light reflected by the half mirror 33, but also by applying the light that has passed through the half mirror 33. Namely, as shown in FIG. 8, the reference light La is totally reflected at the interface between the medium 30 and the air. The pattern formed by interference between the light Lc totally reflected and the body light Lb is recorded on the hologram-recording medium 30. Hence, a holographic stereogram from which a image can be reproduced by passing light through the medium 30 is recorded on the medium 30, too.

The medium-feeding mechanism 50 that is incorporated in the holographic stereogram printer 3 intermittently feeds the hologram-recording medium 30, each time for a distance for one element hologram. The mechanism 50 feeds the medium 30 in this specific way in accordance with a control signal supplied from the control computer 2. Rectangular images, i.e., element holograms, are represented by the image data D4 generated from a train of parallax images D3, are recorded one after another on the hologram-recording medium 30.

The system for preparing a holographic stereogram to be reproduced by the image-reproducing apparatus 5 that is the first embodiment of the invention has been described.

The second embodiment of the invention will be described, with reference to FIGS. 9 and 10. The second embodiment is an image-reproducing apparatus, too. The second embodiment is designed to reproduce a hollow cylindrical holographic stereogram by using a holographic stereogram and an optical member, which are similar to those used in the first embodiment.

Figure 9:
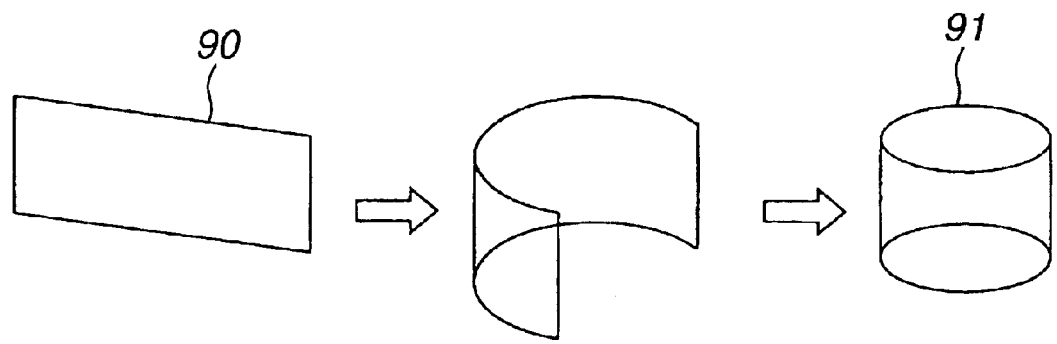
FIG. 9 is a diagram explaining how a hollow cylindrical hologram of an edge-lit type, which is the second embodiment of the invention, is prepared.
Figure 10:
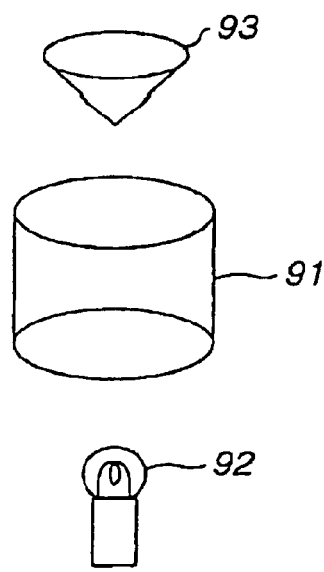
FIG. 10 shows the structure of the apparatus that is the second embodiment of the invention.

To be more specific, an optical member 7 is bonded at its rear side 7b to a holographic stereogram 6 of the type shown in FIG. 4, thus forming a unit 90 shown in FIG. 9. The unit 90 is bent, forming a hollow cylindrical holographic stereogram 91 of an edge-lit type, the inner surface of which is defined by the optical member 7. As shown in FIG. 10, a light source 92 applies illumination light to a conical prism 93. The prism 93 converts the light to parallel light. The parallel light is applied to the inner surface of the holographic stereogram 91 at incidence angle of 60°, thereby reproducing a 3-dimensional image.

In this apparatus, the holographic stereogram 6 and the optical member 7, both being flat, are combined and bent into a hollow cylindrical holographic stereogram 91 of an edge-lit type. The light source 92 applies illumination light to the conical prism 93, which converts the light to parallel light. The parallel light is applied to the inner surface of the holographic stereogram 91 at an incidence angle of 60°. A 3-dimensional image is thereby formed, which looks as if a real body is existing in the hollow cylinder.

Figure 11:
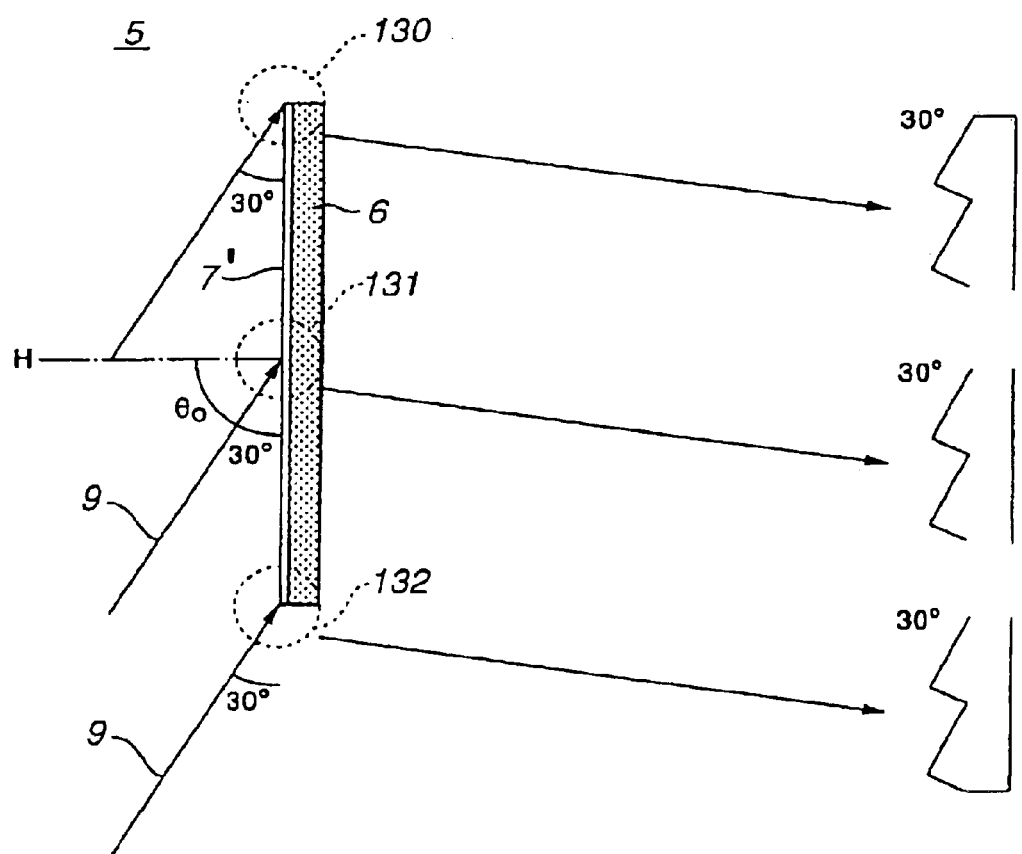
FIG. 11 is a diagram showing how the prisms of the optical member are designed in the first embodiment, in accordance with the manner of applying illumination light to the optical member.

The third embodiment of the invention will be described, with reference to FIGS. 11 and 12. The third embodiment is an image-reproducing apparatus, too. In the first embodiment, the illumination light 9 emitted from the light source is applied to the holographic stereogram 6 as is illustrated in FIG. 11. That is, the light 9 is applied to the upper, middle and lower parts 130, 131 and 132 of the holographic stereogram 6, at the uniform incidence angle of 60° with respect to the normal H to the stereogram 6. Thus, the light 9 is applied to the optical member 7' at incidence angle of 30° (=90°−60°). By contrast, in the third embodiment, the illumination light 134 is applied from the light source 133 to the upper, middle and lower parts 130, 131 and 132 of a holographic stereogram 6 at different incidence angles, as is illustrated in FIG. 12.

In many cases, the illumination light 134 emitted from the light source 133 is not applied to the holographic stereogram 6 at an ideal incidence angle. In view of this, the front side of the optical member 7 consists of parallel triangular prisms that have incidence surface inclined at different angels in accordance with the incidence angles at which the illumination light is applied to the upper, middle and lower parts 130, 131 and 132 of the holographic stereogram 6.

Figure 12:
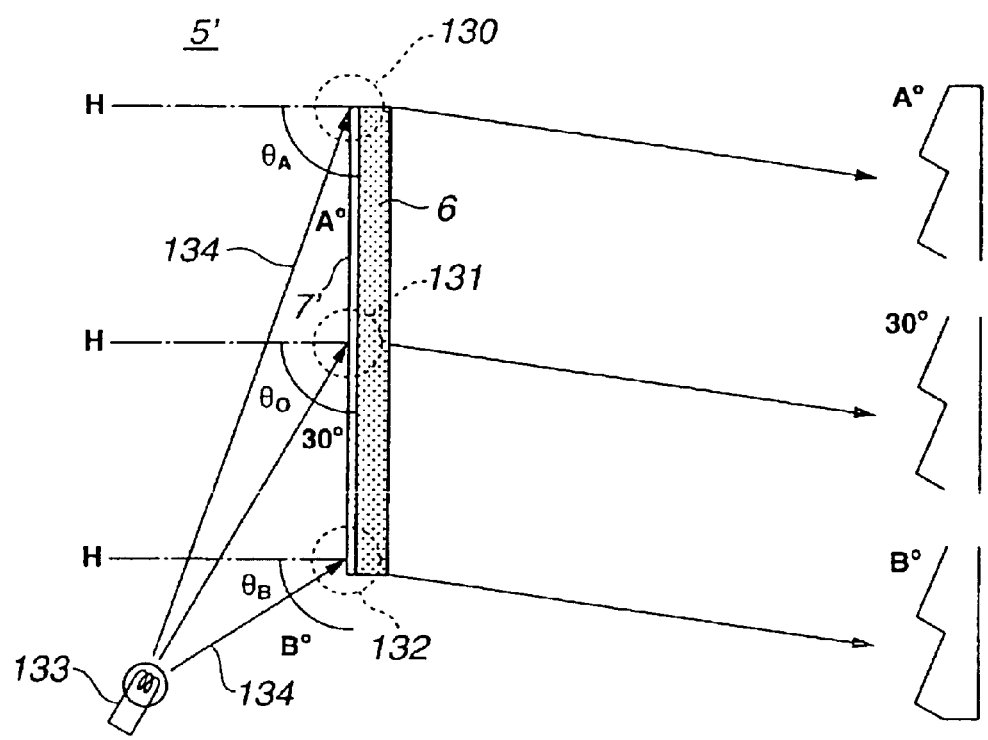
FIG. 12 is a diagram showing how the prisms of the optical member are designed in the third embodiment, in accordance with the manner of applying illumination light to the optical member.

As shown in FIG. 12, the illumination light 134 may define an angle of 30° with respect to the middle part 131 of the stereogram 6. In this case, the angle A between the light 134 and the upper part 130 of the stereogram 6 is smaller than 30°, and the angle B between the light 134 and the lower part 132 is greater than 30°. The incidence surfaces of the triangular prisms on the front side of the optical member 7' are inclined at different angles that accord with the different incidence angles at which the light 134 is applied to the upper, middle and lower parts 130, 131 and 132 of the stereogram 6. Hence, the third embodiment can reproduce 3-dimensional image of high quality in many cases.

The fourth embodiment of this invention will be described, which is an image-reproducing apparatus, too. In the fourth embodiment, a holographic stereogram and an optical member, both being identical to those used in the third embodiment, are bent into a hollow cylindrical holographic stereogram of edge-lit type. This stereogram is used to reproduce a 3-dimensional image.

With the fourth embodiment it is unnecessary to convert the illumination light emitted from the light source to parallel light that is to be applied to the holographic stereogram at an incidence angle of, for example, 60°. Therefore, there is no need to use such a conical prism as is used in the second embodiment. The fourth embodiment can yet form a 3-dimensional image that looks as if a real body were existing in the hollow cylinder.

The fifth embodiment of the invention will be described, with reference to FIGS. 13 and 14. This embodiment is also an apparatus 140 for reproducing a 3-dimensional image from a holographic stereogram. In the fifth embodiment, parallel triangular prisms are provided on only a part of the optical member, not on the entire optical member as in the first embodiment as shown in FIG. 4 and FIG. 11.

Figure 13:
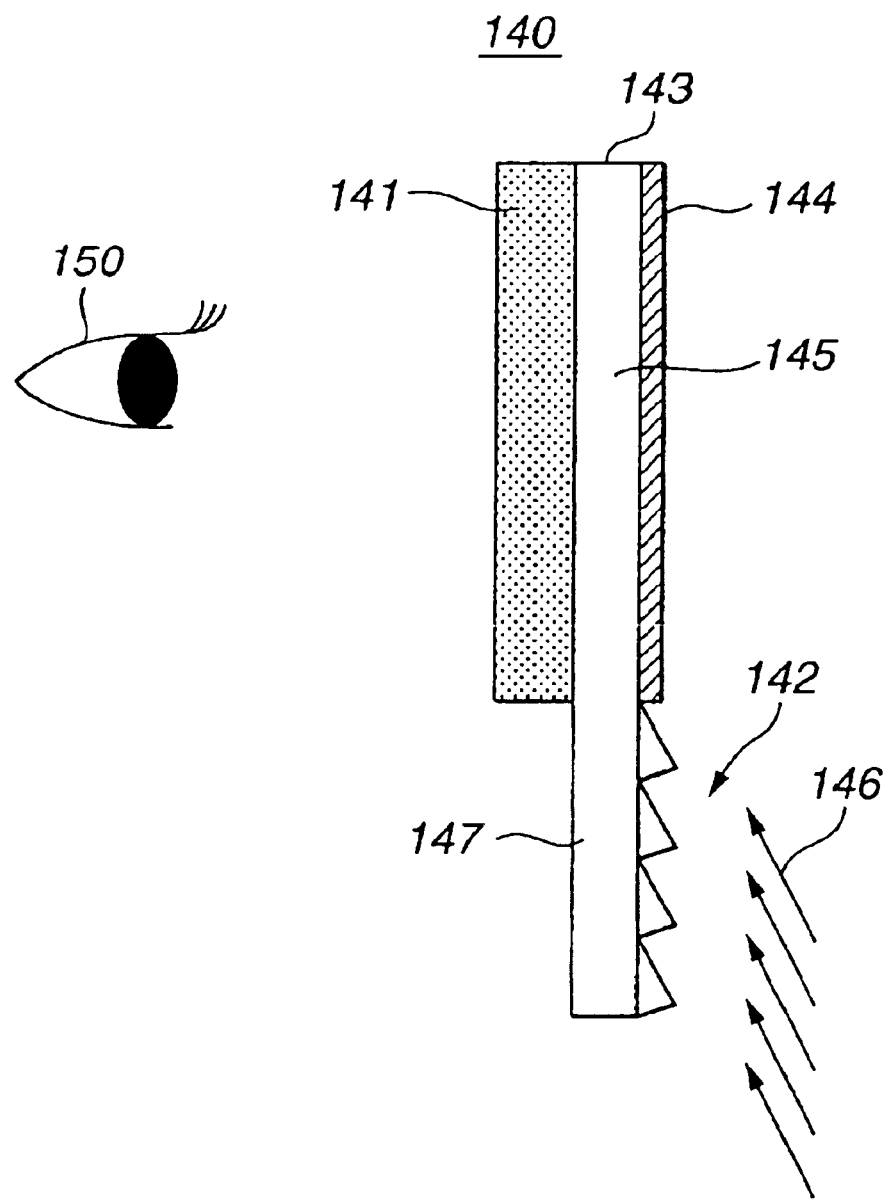
FIG. 13 is a side view of the image-reproducing apparatus according to the fifth embodiment of the invention.

More precisely, as shown in FIG. 13, the apparatus 140 has a holographic stereogram 141 and an optical member 143. The optical member 143 is bonded at its rear side to the holographic stereogram 141. The optical member 143 has parallel triangular prisms 142 on the lower part of its front side. Illumination light 146 is applied to the triangular prisms 142 to form a 3-dimensional image.

The triangular prisms 142 have an incidence surface each, to which the illumination light is applied at right angle. The prisms 142 may have the same incidence angle as in the first embodiment. Alternatively, they may have different incidence angles as in the third embodiment.

The optical member 143 has a light-guiding section 145 for guiding the illumination light 146. The illumination light 146 therefore travels through the light-guiding section 145 while being reflected. The light 146 then passes through the holographic stereogram 141. While passing through the stereogram 141, the illumination light 146 interferes with the light diffracted in the stereogram 141. A 3-dimensional image is thereby reproduced from the stereogram 141.

The outer surface 144 of the light-guiding section 145 is tinted black. Alternatively, a black sheet may be adhered to the outer surface 144 of the light-guiding section 145. The lower part of the optical member 143 is exposed at the inner surface 147 that lies behind the prisms 142.

Figure 14:
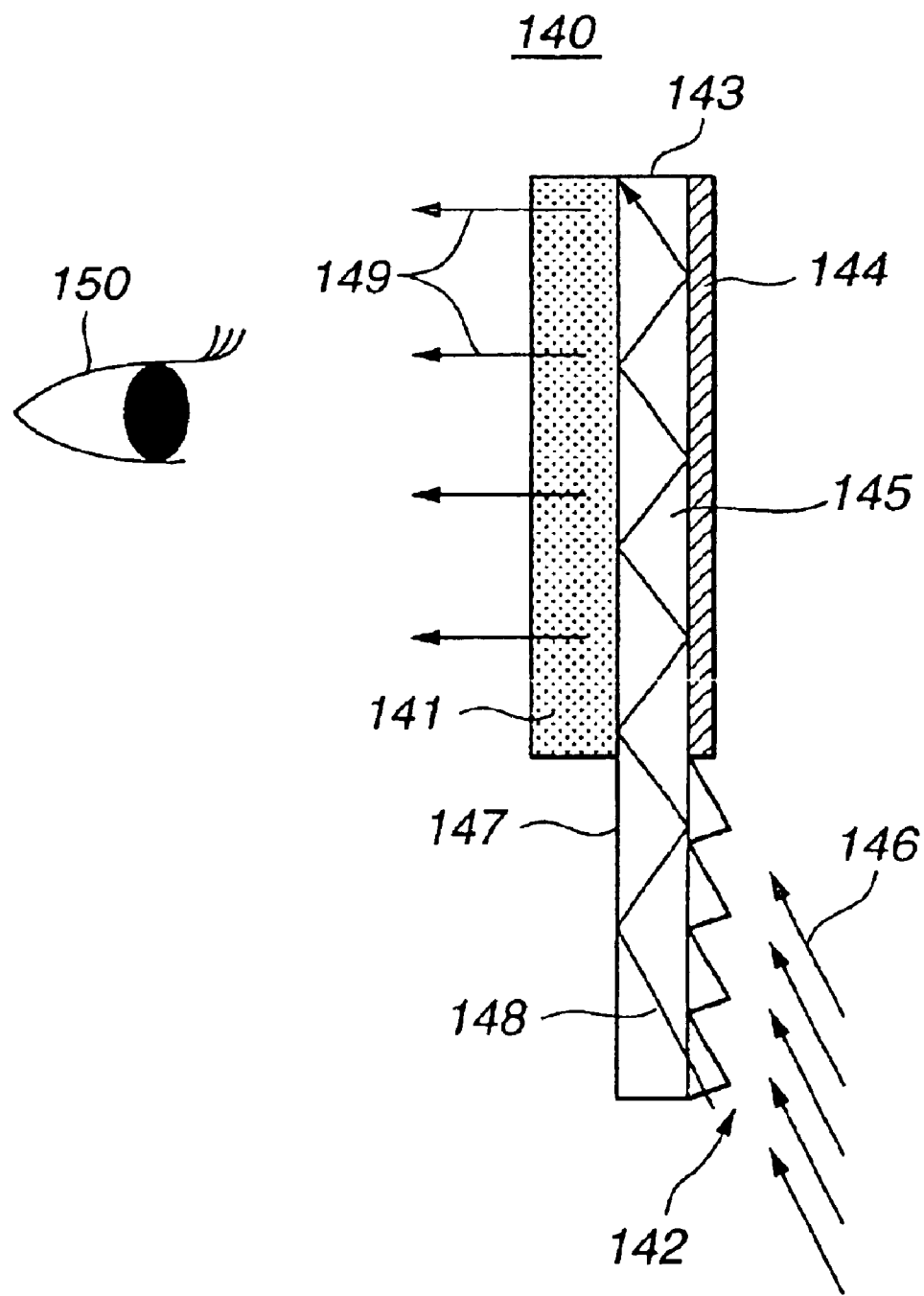
FIG. 14 is a diagram explaining how the fifth embodiment operates.

In the apparatus 140, the illumination light 146 applied to the prisms 142 passes through the optical member 143, while being totally reflected therein, as is illustrated ill FIG. 14. Thereafter, the illumination light 146 interferes with the light 149 diffracted as it passes through the holographic stereogram 141. Therefore, an observer 150 can see a 3-dimensional image.

The sixth embodiment of the present invention will be described. The sixth embodiment is also an apparatus for reproducing a 3-dimensional image from a holographic stereogram. In the sixth embodiment a holographic stereogram and an optical member, both being identical to those used in the fifth embodiment, are bent into a hollow cylindrical holographic stereogram of edge-lit type. The stereogram thus made is used to reproduce a 3-dimensional image.

In the first to sixth embodiments, an optical member is bonded to a holographic stereogram. Alternatively, the optical member may be bonded to a hologram, so that a 3-dimensional image may be reproduced from the hologram.

The image-reproducing apparatus according to this invention is not limited to one having a hologram or a holographic stereogram that records a 3-dimensional image. Rather, the present invention can be applied to one having a hologram or a holographic stereogram that records a 2-dimensional image.

What is claimed is:

1. An image-reproducing apparatus for reproducing an image from a hologram or a holographic stereogram, in which are recorded either 2-dimensional image data or 3-dimensional image data, wherein:

an optical member having parallel prisms on a part of a front surface is bonded at the rear surface to the hologram or holographic stereogram, and illumination light is applied to the parallel prisms, in order to reproduce a 2- or 3-dimensional image from the hologram or holographic stereogram, the illumination light is applied to incident surfaces of the parallel prisms at a fixed incidence angle, the optical member has a light-guiding section for guiding the illumination light from the parallel prisms, while reflecting the illumination light, and the light-guiding section is tinted black at least at a part of an outer surface.

2. An image-reproducing method of for reproducing an image from a hologram or a holographic stereogram, in which are recorded either 2-dimensional image data or 3-dimensional image data, wherein:

an optical member having parallel prisms on a part of a front surface is bonded at the rear surface to the hologram or holographic stereogram, and illumination light is applied to the parallel prisms, thereby reproducing a 2- or 3-dimensional image from the hologram or holographic stereogram, the illumination light is applied to incident surfaces of the parallel prisms at a fixed incidence angle, the optical member has a light-guiding section for guiding the illumination light from the parallel prisms, while reflecting the illumination light, and the light-guiding section is tinted black at least at a part of an outer surface.

* * * * *

UNITED STATES PATENT AND TRADEMARK OFFICE
CERTIFICATE OF CORRECTION

PATENT NO. : 6,903,852 B2  
DATED : June 7, 2005  
INVENTOR(S) : Nobuhiro Kikara Page 1 of 1

It is certified that error appears in the above-identified patent and that said Letters Patent is hereby corrected as shown below:

<u>Title page,</u>
Item [63], Related U.S. Application Data, should read -- [63] Divisional of application No. 09/906,672, filed on Jul. 18, 2001, now Patent No. 6l,738,170. --.

<u>Column 12,</u>
Line 32, "method of for" should read -- method for --.

Signed and Sealed this

Twenty-seventh Day of September, 2005

JON W. DUDAS  
*Director of the United States Patent and Trademark Office*